UNITED STATES PATENT OFFICE.

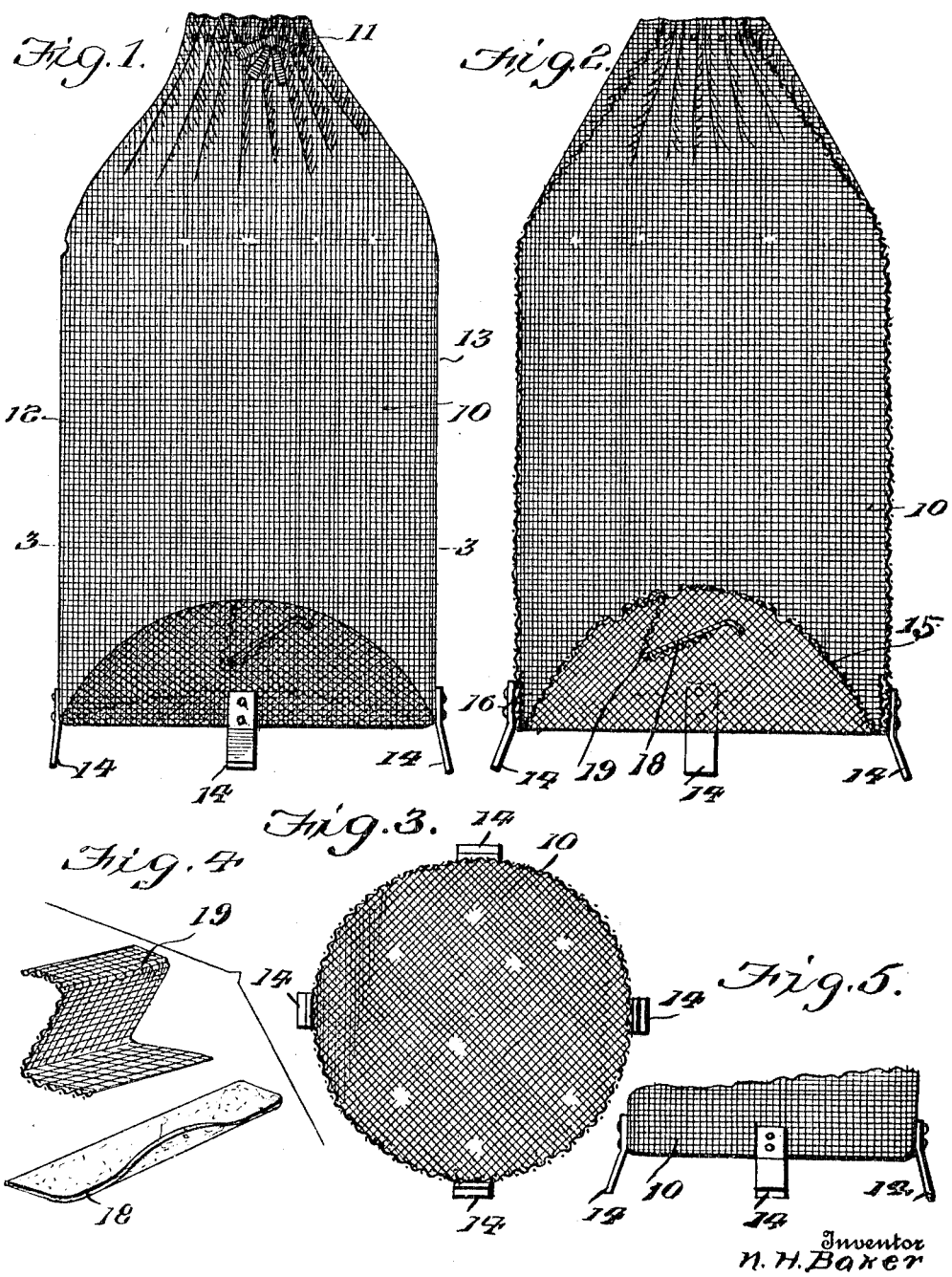

NATHAN H. BAKER, OF FAIRFIELD, IOWA.

FLY-TRAP.

1,120,119.

Specification of Letters Patent.

Patented Dec. 8, 1914.

Application filed August 20, 1913. Serial No. 785,691.

*To all whom it may concern:*

Be it known that I, NATHAN H. BAKER, citizen of the United States, residing at Fairfield, in the county of Jefferson and State of Iowa, have invented certain new and useful Improvements in Fly-Traps, of which the following is a specification.

The present invention relates to new and useful improvements in fly traps and as its principal object contemplates the provision of a device of this character formed in the nature of a collapsible wire-mesh cage, so that while in transit or in storage, the trap may be folded to occupy a minimum space.

An object of equal importance with the foregoing is to construct the base edge of the trap cage so that, while it will support the device on a table or other structure, it will, nevertheless, be spaced from the supporting surface throughout the major portion of its length, permitting the flies or other insects to enter into the conical mouth with which this trap is equipped.

A still further object is to construct the trap with such regard to proportion, number and arrangement of parts that it may be cheaply manufactured, and will be durable and efficient in its action.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a side elevation; Fig. 2 is a vertical section taken through the trap; Fig. 3 is a section on the line 3—3 of Fig. 1; Fig. 4 is a detail view illustrating the bait plate and its retaining clip in disassembled relation; Fig. 5 is a detail view illustrating particularly the formation of the base edge of the trap cage.

Proceeding now to the description of the drawings, the numeral 10 designates as an entirety the body portion of the trap which consists essentially in a sheet of wire gauze or other suitable foraminous material shaped to produce a cylindrical cage. When the body cage 10 is opened to receive the flies or other insects, the upper terminal is sealed by means of a draw string 11 which is threaded through orifices or apertures formed adjacent the upper edge of the member 10. When it is desired to flatten the cage 10 for shipping or storing, it is only necessary to untie the string 11 and to pull the neck of the cage to open position. During the manufacture of the body member 10, it is creased longitudinally on diametrically opposed lines as at 12 and 13, so that it will normally tend to assume a flattened position, being maintained in cylindrical form only when the draw string 11 is tightened, as illustrated in Fig. 1.

As a means for spacing the bottom edge of the cage 10 from the floor, table or other supporting surface on which the device is mounted there has been provided a plurality of legs indicated at 14. These members 14 may be bolted, riveted or otherwise secured in any desired manner to the lower portion of the member 10 and are preferably formed of light sheet metal although any other suitable material may be employed if desired.

As a means for closing the bottom of the cage, there has been provided an inverted bell-shaped hood 15 which is formed of wire gauze or some other suitable and similar material and is equipped with an annular upstanding rim 16 which is riveted or otherwise secured in any desired manner to the lower edge of the member 10. Entrance orifices, indicated at 16, are formed in this hood for the obvious purpose of enabling the flies to pass into the cage. In this connection, it will be noted that inasmuch as the hood 15 is inverted and is arranged with its convex face interiorly of the cage, the entrance of the flies into the trap will not be accompanied with any difficulty, while their exit will be effectually prevented.

In order to attract the flies to the hood, there has been provided a bait plate which is illustrated in detail in Fig. 4, and consists preferably in a substantially rectangular plate 18 formed of pasteboard or any other similar and suitable material. Any kind of bait, such as sugar, molasses, and so forth, may be placed on this bait plate which is held in the desired position interiorly of the hood by means of a supporting clip 19, the upper portion of which is sewed, riveted, or otherwise secured to the concave face of the member 15. This clip 19 is preferably formed of wire gauze so that there will be no suggestion of a barred entrance or exit.

Relative to the advantages resulting from the novel form of structure above described, it is desirable to again emphasize the fact that by merely untying the draw-string 11 the whole trap may be collapsed and folded into a flat sheet-like form for purposes of shipping or storing.

In reduction to practice, I have found that the form of my invention, illustrated in the drawings and referred to in the description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What I claim is:—

1. A fly trap including a collapsible cage adapted to be folded as a flat body, a foldable entrance hood carried by the cage and forming a closure for one end thereof, the other end of said cage being open, and flexible means for closing the open end and holding the cage distended.

2. A fly trap including a collapsible cage, an entrance hood carried by the cage and forming a closure for one end thereof, and a substantially Z-shaped bait plate adapted to be secured to the outermost face of the entrance hood and disposed within the limits thereof, said cage, entrance hood and bait plate being all formed of wire gauze, and supporting legs for normally spacing the lower terminals of the cage and hood from the supporting surface.

In testimony whereof I affix my signature in presence of two witnesses.

NATHAN H. BAKER. [L. s.]

Witnesses:
A. W. JAQUES,
J. S. GANNIS.

Copies of this patent may be obtained for five cents each, by addressing the "Commissioner of Patents, Washington, D. C."